(12) United States Patent
Anderson et al.

(10) Patent No.: US 7,430,347 B2
(45) Date of Patent: Sep. 30, 2008

(54) METHODS, SYSTEMS, AND APPARATUSES FOR OPTICALLY GENERATING TIME DELAYS IN SIGNALS

(75) Inventors: Betty Lise Anderson, Gahanna, OH (US); Stuart A. Collins, Jr., Worthington, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 11/184,535

(22) Filed: Jul. 18, 2005

(65) Prior Publication Data

US 2006/0062517 A1    Mar. 23, 2006

Related U.S. Application Data

(60) Provisional application No. 60/588,730, filed on Jul. 16, 2004.

(51) Int. Cl.
*G02B 6/26* (2006.01)
*G02B 6/42* (2006.01)

(52) U.S. Cl. .............................. 385/27; 385/15; 385/16; 385/17

(58) Field of Classification Search .................. 385/27, 385/15, 16, 17, 18
See application file for complete search history.

(56) References Cited

U.S. PATENT DOCUMENTS

| | | | |
|---|---|---|---|
| 3,428,391 A | 2/1969 | Newcomer | |
| 3,463,571 A | 8/1969 | Boehm et al. | |
| 3,755,676 A | 8/1973 | Kinsel | |
| 3,892,468 A | 7/1975 | Duguay | |
| 4,225,938 A | 9/1980 | Turpin | |
| 4,344,671 A | 8/1982 | Lang | |
| 4,474,434 A | 10/1984 | Carlsen et al. | |
| 4,474,435 A | 10/1984 | Carlsen et al. | |
| 4,546,249 A | 10/1985 | Whitehouse et al. | |
| 4,929,956 A | 5/1990 | Lee et al. | |
| 5,018,816 A | 5/1991 | Murray et al. | |
| 5,018,835 A | 5/1991 | Dorschner | |
| 5,117,239 A | 5/1992 | Riza | |

(Continued)

FOREIGN PATENT DOCUMENTS

JP    10333089 A2    12/1998

(Continued)

OTHER PUBLICATIONS

Chiou et al., "A Mirror Device with Tilt and Piston Motions", Oct. 1999, SPIE, vol. 3893, pp. 298-303.*

(Continued)

*Primary Examiner*—Michelle Connelly-Cushwa
*Assistant Examiner*—Chad H Smith
(74) *Attorney, Agent, or Firm*—Calfee, Halter & Griswold LLP

(57) ABSTRACT

Methods, systems, and apparatuses for producing time delays in optical signals are provided. The methods, systems, and apparatuses allow the time it takes for an individual light beam to travel an individual light path to be varied. In one example, the apparatuses have an array of actuator elements and first and second optical elements arranged such that the time it takes for an individual light beam to travel an individual light path between the array of actuator elements and the first and second optical elements is variable.

20 Claims, 6 Drawing Sheets

U.S. PATENT DOCUMENTS

| | | | |
|---|---|---|---|
| 5,231,405 A | 7/1993 | Riza | |
| 5,274,385 A | 12/1993 | Riza | |
| 5,276,758 A | 1/1994 | Hughes | |
| 5,319,477 A | 6/1994 | DeJule | |
| 5,329,118 A | 7/1994 | Riza | |
| 5,418,880 A | 5/1995 | Lewis et al. | |
| 5,463,497 A | 10/1995 | Muraki et al. | |
| 5,465,175 A | 11/1995 | Woodgate et al. | |
| 5,475,525 A | 12/1995 | Tournois et al. | |
| 5,512,907 A | 4/1996 | Riza | |
| 5,592,333 A | 1/1997 | Lewis | |
| 5,623,360 A | 4/1997 | Gesell et al. | |
| 5,724,163 A | 3/1998 | David | |
| 5,726,752 A | 3/1998 | Uno et al. | |
| 5,767,956 A | 6/1998 | Yoshida | |
| 5,852,693 A | 12/1998 | Jeong | |
| 5,859,967 A | 1/1999 | Kaufeld et al. | |
| 5,936,759 A | 8/1999 | Buttner | |
| 5,973,727 A | 10/1999 | McGrew et al. | |
| 6,014,244 A | 1/2000 | Chang | |
| 6,040,880 A | 3/2000 | Tsuboi | |
| 6,064,506 A | 5/2000 | Koops | |
| 6,181,367 B1 | 1/2001 | McGrew et al. | |
| 6,188,817 B1 | 2/2001 | Goodfellow | |
| 6,236,506 B1 | 5/2001 | Cao | |
| 6,266,176 B1 | 7/2001 | Anderson et al. | |
| 6,323,981 B1 | 11/2001 | Jensen | |
| 6,388,815 B1 * | 5/2002 | Collins et al. | 359/633 |
| 6,429,976 B1 | 8/2002 | Yamamoto et al. | |
| 6,480,323 B1 | 11/2002 | Messner et al. | |
| 6,522,404 B2 | 2/2003 | Mikes et al. | |
| 6,525,889 B1 * | 2/2003 | Collins et al. | 359/836 |
| 6,535,340 B1 | 3/2003 | Saruwatari | |
| 6,637,899 B2 | 10/2003 | Sunaga et al. | |
| 6,647,164 B1 * | 11/2003 | Weaver et al. | 385/16 |
| 6,674,939 B1 | 1/2004 | Anderson et al. | |
| 6,711,316 B2 | 3/2004 | Ducellier | |
| 6,724,535 B1 | 4/2004 | Clabburn | |
| 6,724,951 B1 | 4/2004 | Anderson et al. | |
| 6,734,955 B2 | 5/2004 | Wight et al. | |
| 6,760,140 B1 | 7/2004 | Argueta-Diaz et al. | |
| 6,816,307 B1 | 11/2004 | Sun | |
| 6,922,277 B2 | 7/2005 | Moon et al. | |
| 6,934,069 B2 * | 8/2005 | Moon et al. | 359/290 |
| 6,952,306 B1 | 10/2005 | Anderson | |
| 6,958,861 B1 | 10/2005 | Argueta-Diaz | |
| 7,171,068 B2 | 1/2007 | Bartlett et al. | |
| 7,215,474 B2 | 5/2007 | Argueta-Diaz | |
| 7,236,238 B1 | 6/2007 | Durresi et al. | |
| 2002/0030814 A1 | 3/2002 | Mikes et al. | |
| 2003/0202731 A1 * | 10/2003 | Ionov et al. | 385/15 |
| 2004/0190823 A1 * | 9/2004 | Leuthold et al. | 385/27 |
| 2005/0007668 A1 | 1/2005 | Serati et al. | |
| 2006/0034567 A1 | 2/2006 | Anderson et al. | |
| 2006/0044987 A1 | 3/2006 | Anderson et al. | |
| 2006/0061893 A1 | 3/2006 | Anderson et al. | |
| 2006/0114568 A1 | 6/2006 | Argueta-Diaz | |

FOREIGN PATENT DOCUMENTS

| | | |
|---|---|---|
| WO | WO 01/14924 A1 | 3/2001 |
| WO | WO 02/29436 A1 | 4/2002 |
| WO | WO 03/075048 A2 | 9/2003 |
| WO | WO 03/083521 A2 | 10/2003 |
| WO | WO 03/083541 A2 | 10/2003 |

OTHER PUBLICATIONS

U.S. Appl. No. 10/726,771, Durresi et al.
Anderson, et al., Increasing Efficiency of Optical Beam Steerers, Draft Technical Report #3 for Harris Corporation, The Ohio State University, May 30, 2003, pp. 1-11.
Anderson et al., Binary-Counting True Time Delay Generator Using a White Cell Design and Deformable Mirror Devices, LEOS, Orlando, FL, Dec. 1998, 2 pgs.
Anderson et al., Design Advances in Free-Space Optical True-Time Delay Device, PSAA-8, Monterey, CA, Jan. 1998, 3 pgs.
Anderson et al., Highly Parallel Optical Device to Produce True Time Delays for Phased Array Antennas, Allerton, Sep. 1998, 14 pgs.
Anderson et al., Optically Produced True-Time Delays for Phased Antenna Arrays, Applied Optics, vol. 36, No. 32, Nov. 20, 1997, pp. 8493-8503.
Anderson et al., Optical Cross-Connect Based on Tip/Tilt Micromirrors in a White Cell, IEEE Journal of Selected Topics in Quantum Electronics, vol. 9, No. 2, Mar./Apr. 2003, pp. 579-593.
Anderson, et al. Optical Interconnection Device Based on the White Cell, presentation at Notre Dame University Nov. 6, 2002, 46 pgs.
Anderson, Optical Interconnections, Optical True-Time Delays, and More . . . , presentation at University of Colorado Jan. 28, 2003, 61 pgs.
Anderson et al., Steering of Optical Beams Using True-Time Delay Based on the White Cell, Optical Society of America, 2005, 4 pgs.
Anderson, et al., Polynomial-based optical true-time delay devices with microelectromechanical mirror arrays, Applied Optics, vol. 41, No. 26, Sep. 10, 2002, pp. 5449-5461.
Argueta-Diaz et al., Binary Optical Interconnection: Patent Disclosure Addendum, Mar. 7, 2005, pp. 1-47.
Argueta-Diaz, et al. Reconfigurable Photonic Switch Based on a Binary System Using the White Cell and Micromirror Arrays, IEEE Journal of Selected Topics in Quantum Electronics, vol. 9, No. 2, Mar./Apr. 2003, pp. 594-602.
Chen et al., 1-to-12 Surface Normal Three-Dimensional Optical Interconnects, Applied Physics Letters 63(14), Oct. 4, 1993, pp. 1883-1885.
Cohen et al., Optically Controlled Serially Fed Phased Array Sensor, IEEE Photonics Technology Letters, vol. 8, No. 12, Dec. 1996, pp. 1683-1685.
Collins et al., Numerical Optical Data Processing, Proceedings of the 1978 International Optical Computing Conference, London, England, Sep. 1978, pp. 194-197.
Collins et al., Optics for Numerical Calculations, Proceedings of ICO-11 Conference, Madrid, Spain, 1978, pp. 311-314.
Collins, Jr. et al., Optical True Time Delay for Phased Array Antennas Based on the White Cell, GOMAC, Monterey, CA, Mar. 1999, 4 pgs.
Collins, Numerical Optical Data Processor, SPIE, vol. 128, Effective Utilization of Optics in Radar Systems, 1977, pp. 313-319.
Ewing et al., Advancements in LCoS Optical Phased Array Technology, BNS Boulder Nonlinear Systems (undated), pp. 1-23.
Fairley et al., The Microphotonics Revolution, Mit's Magazine of Innovation, Technology Review, Jul./Aug. 2000, pp. 38-44.
Freitag et al., A Coherent Optically Controlled Phased Array Antenna System, IEEE Microwave and Guided Wave Letters, vol. 3, No. 9, Sep. 1993, pp. 293-295.
Goutzoulis et al., Hybrid Electronic Fiber Optic Wavelength-Multiplexed System for True Time-Delay Steering of Phased Array Antennas, Optical Engineering, vol. 31, No. 11, Nov. 1992, pp. 2312-2322.
Higgins et al., Design and demonstration of a switching engine for a binary true-time-delay device that uses a White cell, Applied Optics, vol. 42, No. 23, Aug. 10, 2003, pp. 4747-4757.
Kunathikom, et al. Design of Delay Elements in Binary Optical True-Time Delay Device that uses a White Cell, Applied Optics, vol. 42, No. 35, Dec. 10, 2003, pp. 6984-6994.
Li et al., Angular Limitations of Polymer-Based Waveguide Holograms for 1-to-many V-shaped Surface-Normal Optical Interconnects, Applied Physics Letters 65(9), Aug. 29, 1994, pp. 1070-1072.
Liu et al., Cascaded Energy-Optimized Linear Volume Hologram Array for 1-to-many Surface-Normal Even Fan-Outs, Optics and Laser Technology, vol. 29, No. 6, 1997, pp. 321-325.
Rader, et al., Demonstration of a Linear Optical True-time Delay Device by Use of a Microelectromechanical Mirror Array, Applied Optics, vol. 42, No. 8, Mar. 10, 2003, pp. 1409-1416.
Saleh et al., Fundamentals of Photonics, Wiley, Aug. 1991.
White, Long Optical Paths of Large Aperture, Journal Optical Society America, vol. 32, May 1942, pp. 285-288.

White, Very Long Optical Paths in Air, Journal Optical Society America, vol. 66, No. 5, May 1976, pp. 411-416.

Yen et al., Operation of a Numerical Optical Data Processor, 1980, SPIE vol. 232, International Optical Computing Conference, 1980, pp. 160-167.

Bishop et al., The Rise of Optical Switching, Scientific American, Jan. 2001, pp. 88-94.

Hect, Many Approaches Taken for All-Optical Switching, Laser Focus World, www.optoelectronics-world.com, Aug. 2001, 5 pgs.

Webb et al., Stroke Amplifier for Deformable Mirrors, Applied Optics, vol. 43, No. 28, Oct. 1, 2004, pp. 5330-5333.

Zdeblick, Design Variables Prevent a Single Industry Standard, Laser Focus World, www.optoelectronics-world.com, Mar. 2001, 4 pgs.

U.S. Appl. No. 09/645,136, Non-final Office Action, mailed Aug. 15, 2001.

U.S. Appl. No. 09/645,136, Notice of Allowance and Fee(s) Due and Notice of Allowability with Examiner's Statement of Reasons for Allowance, mailed Feb. 26, 2002.

U.S. Appl. No. 09/688,478, Non-final Office Action, mailed Jan. 20, 2002.

U.S. Appl. No. 09/688,478, Notice of Allowance and Fee(s) Due and Notice of Allowability with Examiner's Statement of Reasons for Allowance, mailed Jul. 2, 2002.

U.S. Appl. No. 09/688,904, Notice of Allowance and Issue Fee Due and Notice of Allowability with Examiner's Amendment and Examiner's Statement of Reasons for Allowance, mailed Jan. 1, 2001.

U.S. Appl. No. 10/086,355, Non-final Office Action, mailed Feb. 2, 2003.

U.S. Appl. No. 10/086,355, Non-final Office Action, mailed Aug. 13, 2003.

U.S. Appl. No. 10/086,355, Notice of Allowance and Fee(s) Due and Notice of Allowability with Examiner's Amendment, Examiner's Statement of Reasons for Allowance, and Interview Summary, mailed Feb. 18, 2004.

Int'l App. No. PCT/US03/06189, International Search Report, mailed Oct. 20, 2003.

U.S. Appl. No. 10/106,177, Notice of Allowance and Fee(s) Due and Notice of Allowability with Examiner's Statement of Reasons for Allowance, mailed Jun. 12, 2003.

Int'l App. No. PCT/US03/09246, International Search Report, mailed Sep. 4, 2003.

Int'l App. No. PCT/US03/09246, International Preliminary Examination Report, completed Dec. 11, 2003.

U.S. Appl. No. 10/106,776, Non-final Office Action, mailed Jun. 10, 2003.

U.S. Appl. No. 10/106,776, Final Office Action, mailed Nov. 21, 2003.

U.S. Appl. No. 10/106,776, Notice of Allowance and Fee(s) Due and Notice of Allowability, mailed Dec. 11, 2003.

Int'l App. No. PCT/US03/09242, International Search Report, mailed Sep. 23, 2003.

Int'l App. No. PCT/US03/09242, International Preliminary Examination Report, completed Sep. 8, 2004.

U.S. Appl. No. 10/726,770, Non-final Office Action, mailed Aug. 20, 2004.

U.S. Appl. No. 10/726,770, Notice of Allowance and Fee(s) Due and Notice of Allowability with Examiner's Amendment, Examiner's Statement of Reasons for Allowance, and Interview Summary, mailed May 5, 2005.

U.S. Appl. No. 10/726,771, Non-final Office Action, mailed Jan. 1, 2005.

U.S. Appl. No. 10/726,771, Final Office Action, mailed Oct. 6, 2005.

U.S. Appl. No. 10/726,771, Non-final Office Action, mailed Jan. 30, 2006.

U.S. Appl. No. 10/726,771, Notice of Allowance and Fee(s) Due and Notice of Allowability with Examiner's Statement of Reasons for Allowance and Interview Summary, mailed Sep. 12, 2006.

U.S. Appl. No. 10/726,771, Notice of Allowance and Fee(s) Due and Notice of Allowability with Examiner's Statement of Reasons for Allowance, mailed Feb. 28, 2007.

U.S. Appl. No. 10/727,009, Notice of Allowance and Fee(s) Due and Notice of Allowability with Examiner's Statement of Reasons for Allowance, mailed Dec. 7, 2004.

U.S. Appl. No. 10/727,009, Notice of Allowance and Fee(s) Due and Notice of Allowability with Examiner's Statement of Reasons for Allowance, mailed May 24, 2005.

U.S. Appl. No. 11/183,029, Non-final Office Action, mailed Nov. 20, 2006.

U.S. Appl. No. 11/256,578, Non-final Office Action, mailed Mar. 29, 2006.

U.S. Appl. No. 10/256,578, Notice of Allowance and Fee(s) Due and Notice of Allowability with Examiner's Statement of Reasons for Allowance, mailed Aug. 17, 2006.

U.S. Appl. No. 10/256,578, Notice of Allowance and Fee(s) Due and Notice of Allowability with Examiner's Statement of Reasons for Allowance, mailed Dec. 6, 2006.

Collins et al., An Experimental Numerical Optical Processor (NOP), Digest of Papers for Compcon 78, IEEE catalog No. 78CH1328-4C, San Francisco, CA, Feb. 28-Mar. 3, 1978, pp. 198-199.

Collins, Jr., The Design of Devices for Producing Optically Controlled Incremental Time Delays for Phased Array Radars, National Reconnaissance Office, Contract No. NRO-98-C-6002, Technical Report 736076-1, The Ohio State University, Oct. 1998, 60 pages.

Collins, Jr. et al., True Time Delay with Binary Time Delay for Large Arrays, 1998 Antenna Applications Symposium, Allerton Park, Monticello, IL, Sep. 1998, 13 pages.

Dolphi et al., Experimental Demonstration of a Phased-Array Antenna Optically Controlled with Phase and Time Delays, Applied Optics, vol. 35, No. 26, Sep. 10, 1006, pp. 5293-5300.

Int'l App. No. PCT/US00/23361, International Search Report, mailed Jan. 8, 2001.

Int'l App. No. PCT/US00/23361, International Preliminary Examination Report, completed May 8, 2001.

EP App. No. 00 96 1366, Supplementary European Search Report, completed Apr. 3, 2003.

Non-Final Office Action mailed on Jan. 15, 2008 in U.S Appl. No. 11/182,111.

U.S. Appl. No. 11/801,105, Non-final Office Action, mailed Apr. 29, 2008, 9 pages. (18525.04150).

U.S. Appl. No. 11/184,536, Non-final Office Action, mailed May 1, 2008, 9 pages. (18525.04114).

* cited by examiner

US 7,430,347 B2

METHODS, SYSTEMS, AND APPARATUSES FOR OPTICALLY GENERATING TIME DELAYS IN SIGNALS

CROSS REFERENCES TO RELATED APPLICATIONS

This application claims priority to U.S. Provisional Application Ser. No. 60/588,730 filed Jul. 16, 2004, which is incorporated by reference herein.

BACKGROUND

Optical signals are potentially useful in a variety of applications. For example, optical signals can be used in optical phased arrays, programmable tapped delay lines for optical correlators, and matched filters. In many applications, it is desirable to produce a steered optical beam. However, methods for steering an optical beam can be inefficient. For example, optical beam steering can be accomplished using liquid crystals to provide phase shifting. In this system a single large optical beam illuminates a pixilated liquid crystal spatial light modulator, each element of which can provide a phase shift of up to about $2\pi$. The phase is reset periodically across the spatial light modulator, producing, in effect, a blazed grating. This results in undesirable dispersion of the optical beam. Thus, it would be desirable to have improved methods of providing steered optical beams.

SUMMARY

In accordance with embodiments of the present invention, apparatuses for optically generating time delays in signals are provided. The apparatuses can comprise an array of actuator elements at least one optical element. The array of actuator elements and the at least one optical element can be configured such that at least one input light beam illuminates at least one of the actuator element such that an individual light beam travels a light path between the array of actuator elements and the at least one optical element. The height of each actuator element is variable such that the time it takes for the individual light beam to travel the light path can be variable.

In accordance with embodiments of the present invention, methods for optically generating time delays in signals are provided. The methods can comprise inputting at least one input light beam from at least one direction; reflecting the input light beam onto at least one actuator element in an array of actuator elements such that the input light beam forms at least one individual light beam; reflecting the at least one individual light beam between the array of actuator elements and at least one optical element such that the individual light beam travels an individual light path; and controlling the height of each of the actuator elements from which the at least one individual light beam reflects such that the amount of time in which the individual light beam travels the individual light path is controlled.

In accordance with embodiments of the present invention, systems for optically generating time delays in signals are provided. The systems can comprise a plurality of optical time delay apparatuses selected to form a steered optical beam of a desired width. Each optical time delay apparatus can comprise an input light source adapted to generate at least one input light beam from at least one direction; an input mirror adapted to reflect the at least one input light beam; an array of actuator elements; and at least one optical element. The array of actuator elements and the at least one optical elements can be configured such that the input light beam reflected by the input mirror illuminates at least one actuator element such that an individual light beam travels a light path between the array of actuator elements and the at least one optical element. The height of each actuator element is variable such that the time it takes for the individual light beam to travel the light path can be variable. The systems can further comprise at least one controller programmed to control the height of each actuator element in each optical time delay device such that the individual light beams from each optical time delay apparatus exits each of the optical time delay devices and propagates as a steered light beam of a desired width at a desired angle.

BRIEF DESCRIPTION OF THE SEVERAL VIEWS OF THE DRAWINGS

The following detailed description of embodiments of the present invention can be best understood when read in conjunction with the following drawings, where like structure is indicated with like reference numerals and in which.

DETAILED DESCRIPTION OF EMBODIMENTS OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety.

Figure 1:
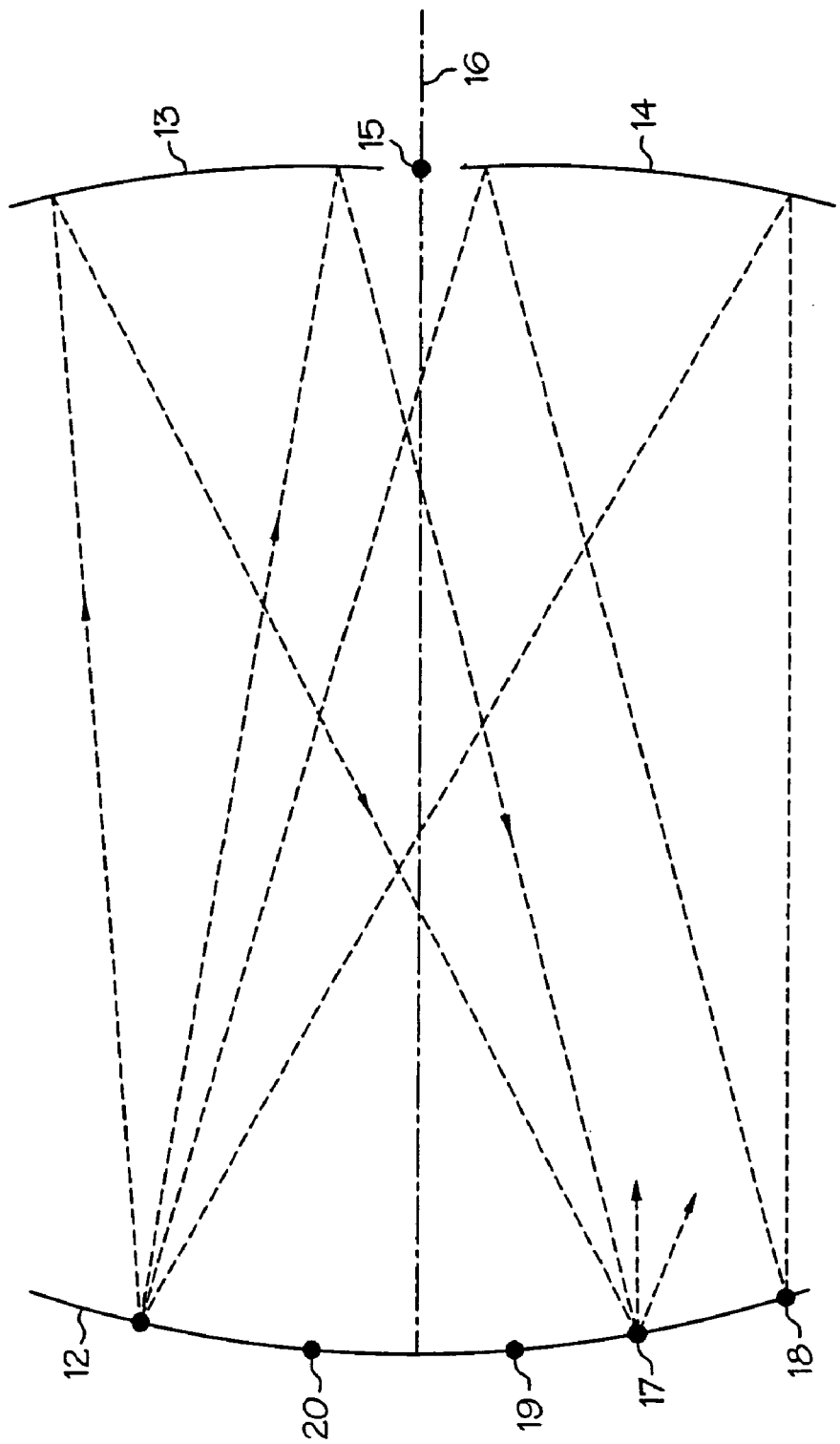
FIG. 1 is a top view of a traditional White cell.

The present invention utilizes the principles of the traditional White cell. FIG. 1 is a diagram of the path of a light beam passing through a traditional White cell. The cell comprises three identical spherical mirrors, all of the same radius of curvature. The first mirror 12 is separated from the second 13 and third 14 mirrors by a distance equal to their radii of curvature. The center of curvature 15 of the first mirror lies on the centerline or optical axis 16 and falls between the second and third mirrors. The second and third mirrors are aligned so that the center of curvature 20 of the second mirror 13 and the center of curvature 19 of the third mirror 14 land on the first mirror, for example an equal distance from the optical axis. Light from the second mirror is imaged onto the third mirror, and vice versa. Light is input onto a spot 18 in the plane of but off the edge of the first mirror; the light beam is prepared so that it expands as it goes to the third mirror. The third mirror refocuses the beam to a point on the first mirror. The beam is then reflected to and expanded at the second mirror. The second mirror refocuses the light beam to a new spot 17 on the first mirror. At this point, the light may either exit the cell if the spot is off the edge of the first mirror, or continue to traverse the cell. The beam may traverse the cell a predetermined number of times, depending on the locations of the centers of curvature of the second and third mirrors.

Figure 2:
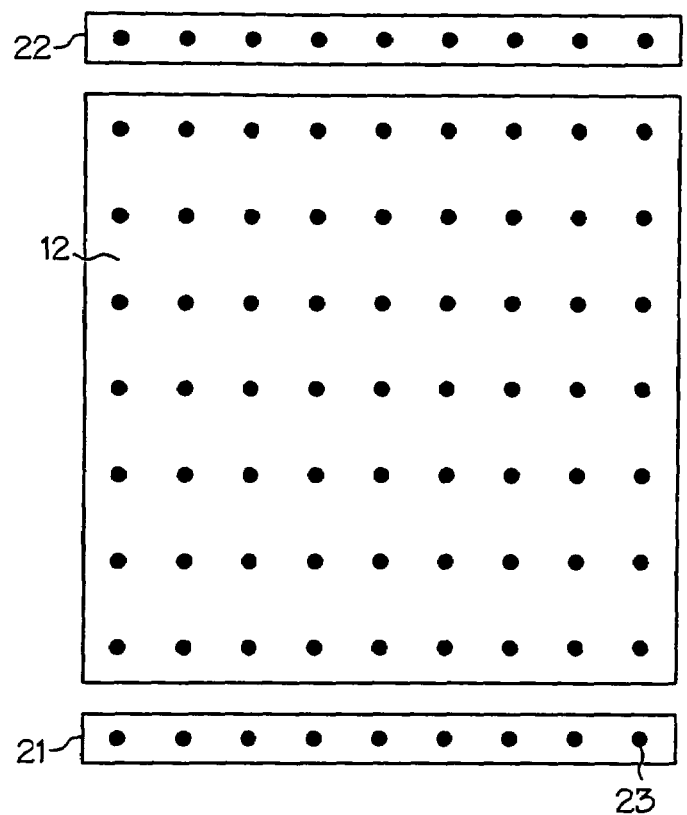
FIG. 2 is a front view of the spot pattern formed by a traditional White cell.

The angle of the input beam may be controlled by an input turning mirror 21, as shown in FIG. 2. The angle of the output beam may be controlled similarly by an output turning mirror 22. Each input of a light beam is shown by a spot 23 on the turning mirrors or the first mirror 12. Multiple light beams are shown, and multiple light beams can circulate through the cell at the same time. When many different beams are introduced, each one traces out unique spot pattern on the mirror 12. These beams do not interfere with each other. An arbitrary number of beams can be introduced with no effect. Each beam of light requires the same amount of time to navigate the cell. A beam of light may be reflected off the input turning mirror into the White cell, and may traverse the cell until the beam is directed to the output turning mirror, at which point it may exit the cell.

In one embodiment, an apparatus for optically generating time delays in signals is provided. Referring to FIGS. 3, 4A, 4B, and 4C, an apparatus 30 for optically generating time delay signals is illustrated. The apparatus 30 can have an input light source (not shown) that generates at least one input light beam 32 from at least one direction. The apparatus can additionally have an input mirror 34 adapted to reflect the input light beam 32. The apparatus has an array 36 of actuator elements 37 and first and second optical elements 38, 40. The array 36 of actuator elements 37 and the first and second optical elements 38, 40 are configured such that an input light beam 32 illuminates at least one of the actuator elements 37 such that an individual light beam 33 travels a light path 44 between the array 36 of actuator elements 37 and the first and second optical elements 38, 40.

The array 36 of actuator elements 37 is configured to act in place of the mirror 12 in the traditional White cell. The height of each actuator element 37 is variable such that the time it takes for the individual light beam 33 to travel the light path 44 is variable, as described herein. The height of each actuator element 37 can be varied in any suitable manner. For example, each actuator element 37 can be an actuator, whose height varies with an applied voltage. In one example, the array 36 can comprise a micro-electromechanics system (MEMS), piezo-electric pistons, or electro-ceramics.

It will be understood that the height of each actuator element 37 can be varied any suitable amount to any suitable resolution. For example, the height of each actuator element 37 can be varied to any position from about 0 μm high to about 1 μm high, to about 5 μm high, to about 10 μm high, or to about 15 μm high. In another example, the height of each actuator element 37 can be varied to any position from about 1 μm to about 15 μm or about 5 μm to about 10 μm. It will also be understood that each actuator element 37 can be of any suitable shape. For example, the actuator element can be square, circular, or any other suitable shape.

The actuator elements 37 and the array 36 can be controlled in any suitable manner. For example, the actuator elements can be controlled by a controller. In another example, the actuator elements can be controlled by a controller having control logic designed to control the height of the actuator elements in any desired manner.

The array 36 can be adapted to reflect the light beam 33 in any suitable manner. In one example, a flexible membrane (not shown) can be stretched across the array 36 of actuator elements 37. In another example, such actuator element 37 can be reflective. When a planar array 36 is used, as shown in FIGS. 4A and 4C, a lens 46 can be provided to image mirror 38 onto mirror 40 and image mirror 40 onto mirror 38 In another example, the actuator elements 37 can be formed as an array 36a on a spherical surface, so that the lens 46 is unnecessary, as illustrated in FIG. 4B.

The first and second optical elements 38, 40 can be any suitable optical elements. For example, the first and second optical elements 38, 40 can be spherical mirrors. In another example, the first and second optical elements 38, 40 can be replaced with the two optical elements of a Herriot cell. In another example, the first and second optical elements 38, 40 can be replaced by a roof prism as discussed in U.S. Pat. No. 6,266,176. It will be understood that the first and second optical elements 38, 40 can be replaced by any suitable arrangement of optical elements for producing the necessary spot pattern for a given input beam as discussed further herein.

Figure 3:
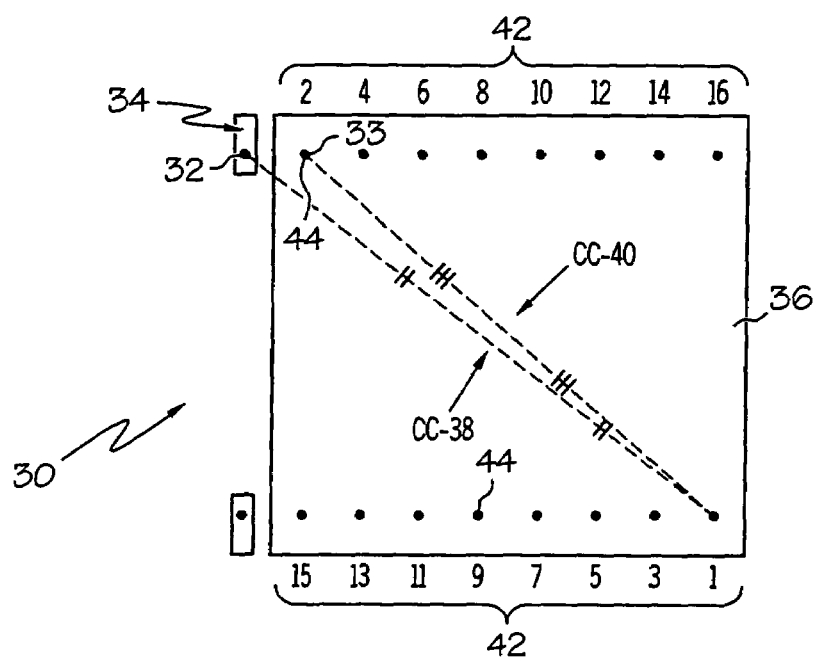
FIG. 3 is a front view, including the light beam, of an apparatus in accordance with embodiments of the present invention.
Figure 4A:
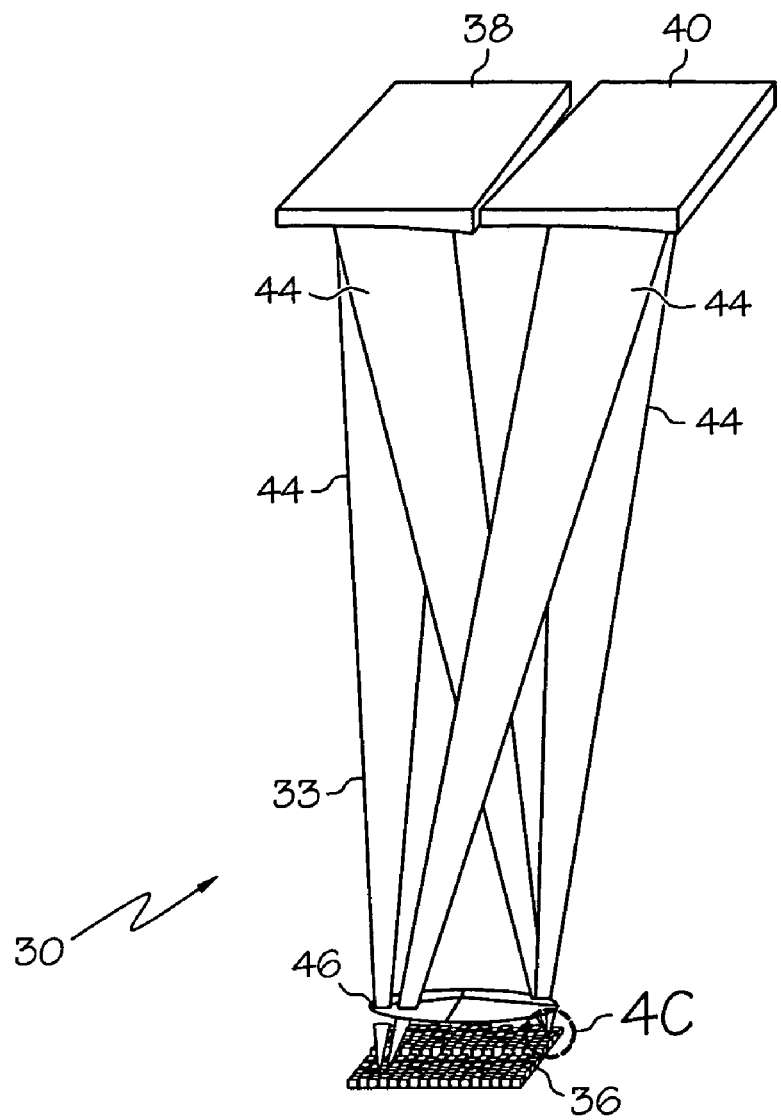
FIGS. 4A and 4B are perspective views of an apparatus in accordance with embodiments of the present invention.
Figure 4C:
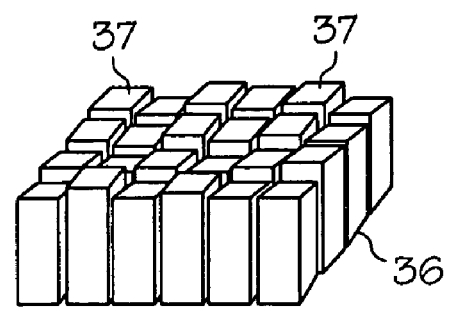
FIG. 4C is a detail view of the area indicated in FIG. 4A in accordance with embodiments of the present invention.
Figure 4B:
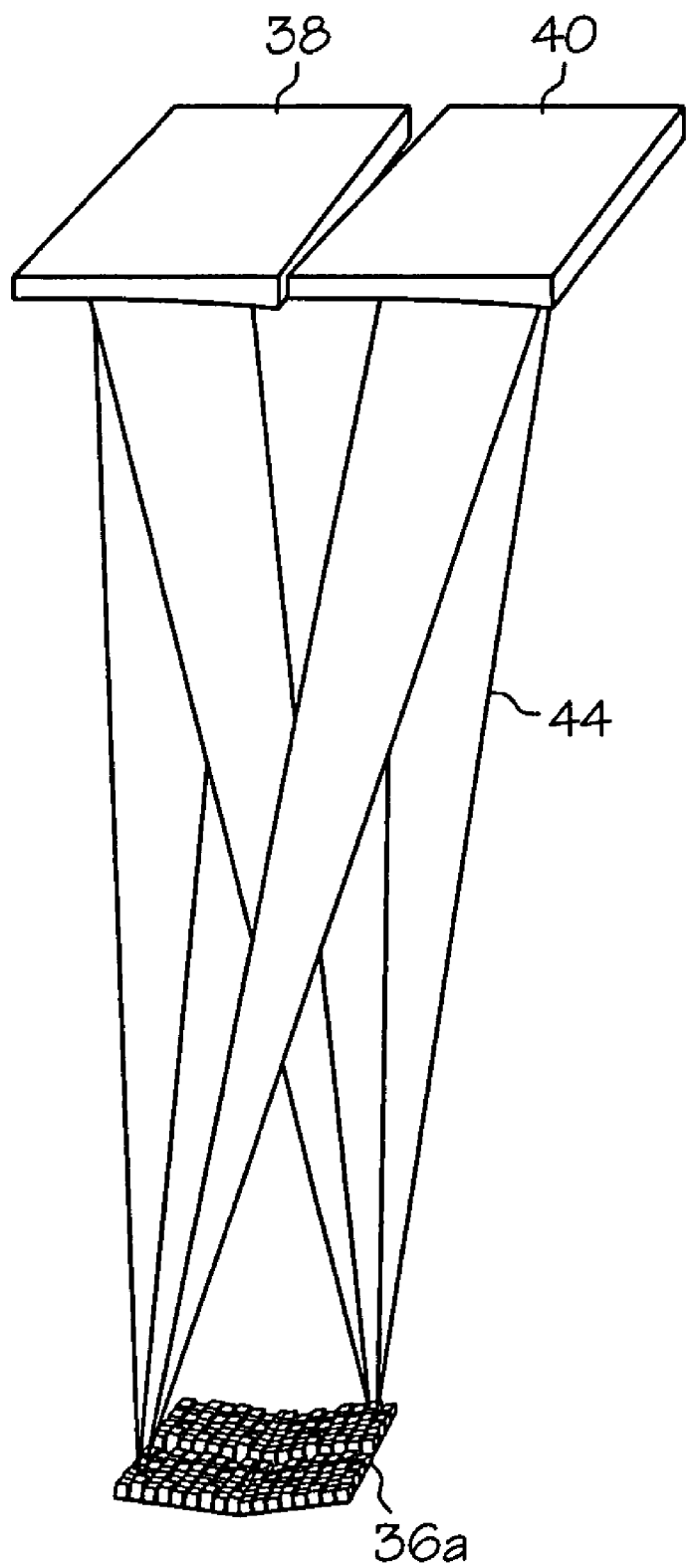

As can be seen in FIGS. 3, 4A and 4B, the light beam 33 travels a path between the array 36 and the first and second optical elements 38, 40. For example, each light beam 33 can travel a light path 44 that includes 16 bounces 42 from the first and second optical elements 38, 40 to the array 36 as illustrated. It will be understood that the apparatus 30 can be configured such that the light beam 33 makes any desired number of bounces.

Figure 5:
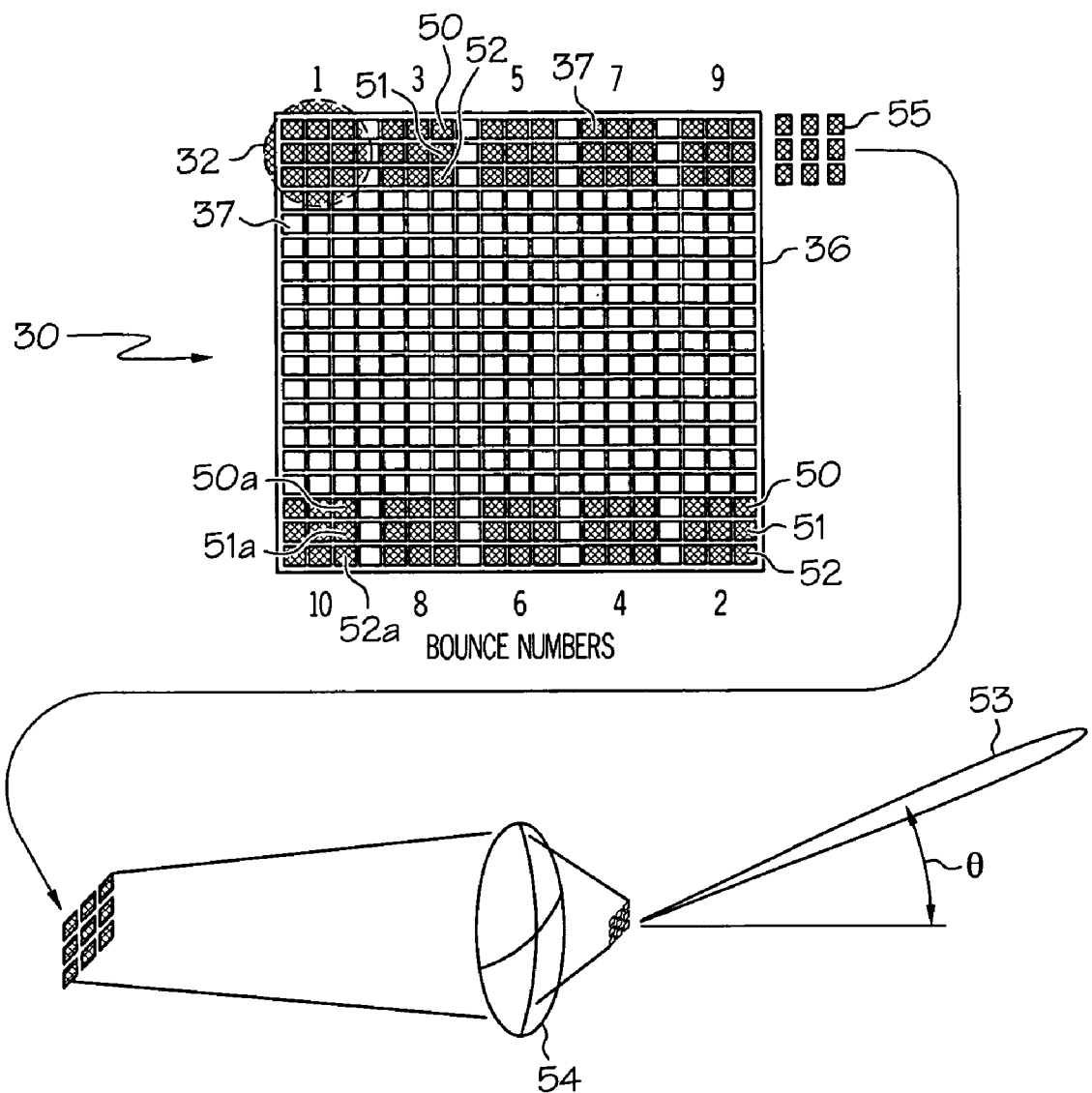
FIG. 5 is a diagram illustrating the operation of an apparatus in accordance with embodiments of the present invention.

In one embodiment, an input light beam 32 can be configured to illuminate a plurality of actuator elements 37 as shown in FIG. 5. This illumination generates an array of individual light beams, such as light beams 50, 51, and 52, that travels individual light paths, such as light paths 50a, 51a, and 52a, between the array 36 and the first and second optical elements 38, 40.

In one example, each individual light beam, such as light beams 50, 51, 52, can reflect off of a different set of actuator elements 37 as illustrated in FIG. 5. The heights of each different set of actuator elements 37 can be controlled such that the time it takes for each individual light beam 50, 51, 52 to travel each individual light path 50a, 51a, 52a is variable. It will be understood that the time it takes for each individual light beam to travel each individual light path can be selected to be any value. For example, one or more light beams can travel their individual light paths at a time less than or more than it takes another light beam to travel its individual light path.

In one embodiment, the operation of the apparatus 30 can be described as follows. A light beam requiring no delay relative to some reference time strikes a set of m actuator elements 37, where m is the number of bounces. Each of these actuator elements 37 is set to some height. For example, the actuator element 37 can be set to the maximum actuator element height. This light beam bounces back and forth between the optical elements 38, 40 and the array 36, strikes these m actuator elements 37, and takes some total amount of time t to exit the cell.

Now consider a second light beam, in order to generate a time delay of the minimum delay increment Δ the operation is as follows. For the actuator elements 37 that this beam strikes, all are at their maximum heights, except for one actuator element 37 which is actuated to be shorter by a distance $c\Delta/2$, where c is the speed of light. Thus, this light beam 33 requires a time $\Delta$ longer to traverse the apparatus 30 than the first beam. It emerges at a time, $t+\Delta$. The factor of "2" comes from the fact that the beam goes to the shorter actuator element 37 and returns from it, accumulating a path difference equal to twice the height difference.

Each actuator element 37 can be actuated to any position within the resolution of the apparatus within some range, which is the stroke of the actuator element 27. For example, the stroke of a single actuator element 37 can be 5 μm. If a beam strikes one actuator element 37 operating at its minimum height and all the other pistons are at their maximum, it emerges at a time equal to:

$$t + \frac{2(5 \times 10^{-6})}{c} = t + 33\,fs.$$

The delay can be set to any value up to this number by adjusting the height of a single actuator element 37. For longer delays, more than one actuator element 37 can be actuated, each at any arbitrary height within its stroke and to the resolution allowable.

If the stroke is given by S, and the number of bounces is m, the maximum delay that can be obtained for a given light beam is $$T_{max} = \frac{2mS}{c}$$

As an example, for a stroke of S=10 μm, and m=20 bounces, the maximum time delay would be 1.3 ps. This corresponds to a path difference of 400 μm. For a wavelength of 1.5 μm, this corresponds to a delay of 267λ. In another example, when the array 36 has a 12-bit driver, meaning each actuator element 37 can be actuated to $2^{12}$ different heights within an assumed 10 μm stroke, the driver can move the actuator element 37 in 17 attosecond increments (in spatial terms 5 nm, or $\lambda/333$ at $\lambda=1.5$ μm).

In one embodiment, it can be desirable to have a smaller step increment for at least some of the actuator elements 37. For example, at least some of the actuator elements 37 can have a smaller stroke. For example, the actuator elements can have a stroke of about 1 μm. Thus, a 12-bit driver moves those actuators in 1.7 attosecond increments, or $\lambda/3333$ at $\lambda=1.5$. If the stroke is smaller, however, the maximum time delay will also be smaller.

In another embodiment, some of the actuator elements 37 are designed to have a maximum stroke of a small interval, and other actuator elements 37 are designed to have a larger stroke and larger step size. In this embodiment, the actuator elements 37 are chosen such that every individual light beam visits some short-stroke and some long-stroke actuator elements 37. This provides increased flexibility in the delay increment and range.

For example suppose there are 20 bounces on an array 36. Furthermore let every beam strike 10 actuator elements 37 that have a stroke of 1 μm, with step size 2.4 nm (12 bit driver). The minimum delay is thus 4.8 Å and the maximum is $2 \times 10$ bounces $\times 10^{-6}$ = 20 μm. The remaining 10 actuator elements have a stroke of 10 μm, and the light beam can have a maximum delay of 220 μm. For longer delays, one can use one of the optical true time delay devices already described in U.S. Pat. Nos. 6,388,815, 6,525,889, and 6,674,939.

Referring to FIG. 5, in one embodiment, a light beam 32 illuminates a group of actuator elements 37 on the array 36. The illuminating light beam 32 can be tapered to reduce edge effects as shown. For an N×M optical array to be steered, the illuminated area of the array 36 is N×M actuator elements 37. For example, this is shown in FIG. 5 for a 3×3 array. It is noted that some light can be lost between the actuator elements 37. In another example, the input light beams can be an array of light spots generated by a fiber array, Talbot generator, or any other suitable source.

The illuminated N×M actuator element array is subsequently re-imaged multiple times by bouncing between the array 36 and the first and second optical elements 38, 40 as described herein. FIG. 5 shows one example of pattern of the bounces on the array 36. On each bounce, the images of the input actuator element array land on another set of actuator elements 37, each of which is set to the appropriate height to produce the desired delays. The input actuator array is re-imaged repeatedly for m bounces. Thus, when the beams that make up the input actuator array exit the apparatus, the correct relative delays have been imparted to each beam in the output array 55. The output array 55 can be subsequently demagnified in any suitable manner. For example, the output array can be demagnified by a lens 54. The composite beam 53 formed by the superposition of the light beams from the output array 55 propagates at the steering angle θ. This steering angle θ is selected by selecting the time it takes for each individual light beam in the array of individual light beams to travel each individual light path. This steered beam 53 is the output of an optical phased array.

The possible steering angle of an optical phased array is limited by two things: the range of delays and the element factor. In the apparatus 30, the range of delays is for all practical purposes unlimited. The element factor, however, is limited by the laws of physics for all optical phased array approaches. The beam produced by a phased optical array is the product of the array factor AF, arising from the repetition of a large number of elements, and the element factor EF, which arises from the size of the individual optical beams.

Figure 6:
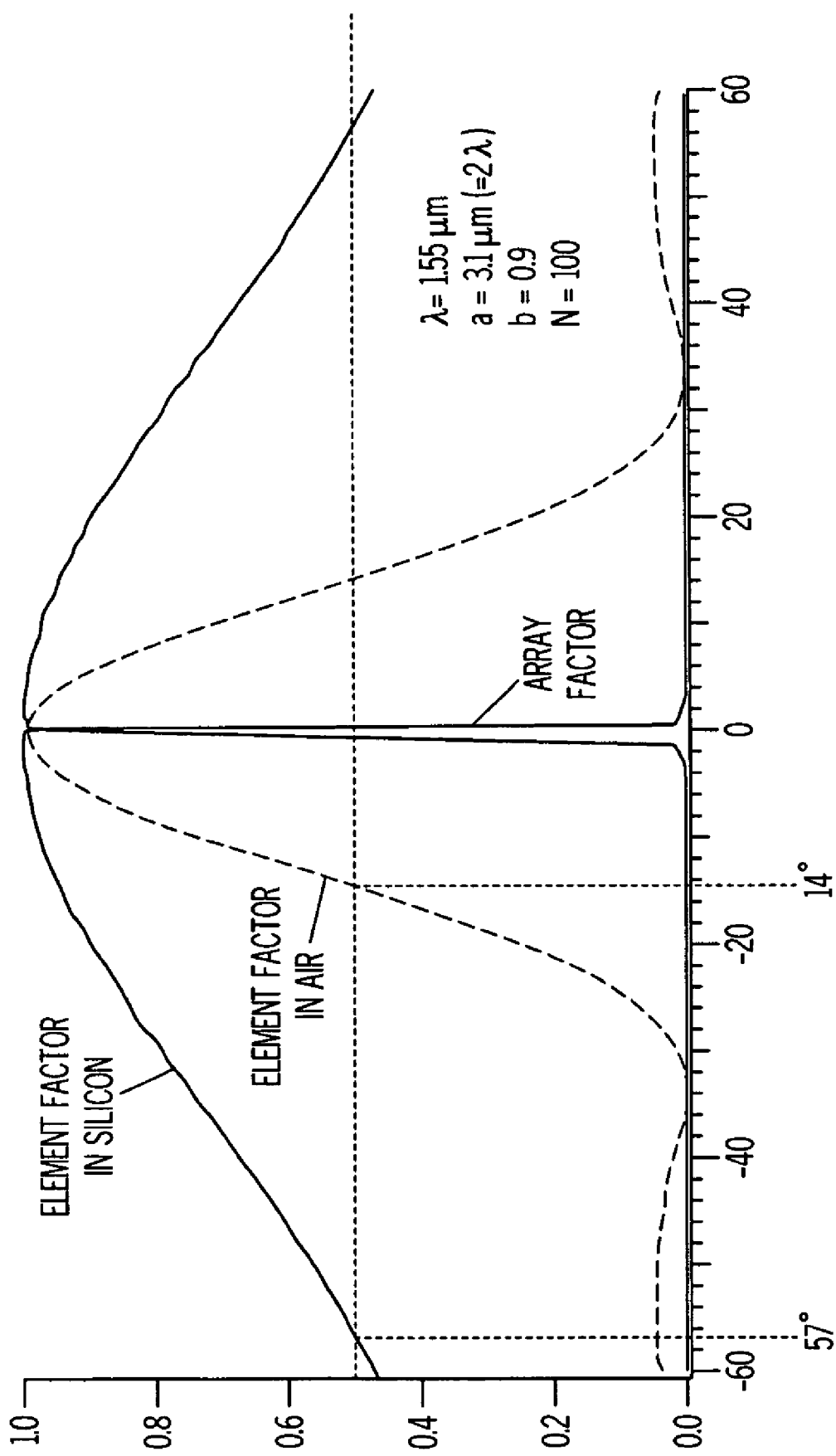
FIG. 6 is a plot of the element factor and the array factor of apparatus in accordance with embodiments of the present invention.

FIG. 6 is a plot of the element factor and the array factor. The spike (coming from the array factor, plotted here for N=100 light beams) is swept across the field of view, being attenuated by the EF envelope. The spots created by the light beams 33 can be of any size in the apparatus, and can be chosen to match the actuator element 37 size of the available array 36. After being delayed, the output array 55 can be demagnified to produce small individual array elements and thus maximum the steering range. Assuming rectangular elements with a b=0.9 fill factor, and that they can be shrunk to a size about $\alpha=2\lambda$, the beams can be steered to about ±14°.

In one example, the steering angle can be improved by improving the diffraction angle of a particular element. For example, the smallest beam or spot in the output array 55 can be passed through an appropriately sized aperture (not shown) that is made photolithographically using a very short wavelength of light. Thus, the sides of the aperture will sharpen the edges of the spot and the diffraction angle can be improved.

In another example, the steering angle can be improved by forming a final set of images in a high-index material (not shown), rather than air, before the output array 55 image is formed. For example, the image of the output array 55 can be smaller by a factor of n, where n is the refractive index. In one example, the high-index material can comprise silicon. Silicon is transparent to light at 1.55 μm and has a refractive index of 3.4, reducing the spot size of an element in the output array 55 by a factor of 3.4 and increasing the steering angle to ±57°. This can be seen in FIG. 6.

As in phased array antennas, the possible beam width of a steered beam 53 from the apparatus 30 is a function of the number beams in the output array 55. For example, to illuminate a 10 m target at a distance of 100 km requires a beam width of 100 μrad, translating to 5000 elements, or 5000 individually delayed beams for a one-dimensional output array 55. Thus, the present invention provides the ability of many light beams to circulate through the apparatus 30 simultaneously, thus using the same apparatus to produce true time delays for many light beams (spots). The limiting factor for the beam width is the number of actuator elements 37 in the array 36 and the number of bounces required to get the required time delay. For example, for 5000 individual beams (spots) and 16 bounces in the array 36, 80,000 actuator elements 37 are needed. Assuming the array 36 could be made in 128×128 actuator elements 37 array sizes, it would require just five apparatus 30 to provide a true time delay for each of the required individual light beams.

In another example, for a 5,000 element output array 55 (in one dimension), it can be necessary to require a 5000×16 actuator element 37 array 36, which can be an awkward length and aspect ratio. Thus, it is possible to divide up the 5000 output array 55 into multiple shorter arrays, and use a White cell spot inter-leaver to reconstruct the long array after the delays have been implemented. One such inter-leaver arrangement is described in U.S. Provisional Patent Application No. 60/588,731 filed Jul. 16, 2004 and in the non-provisional U.S. Patent Application having that claims priority thereto. Both these applications are hereby incorporated by reference.

In another example, if the required beamwidth of the steered beam 53 is 10 μrad, then 50,000 individual delayed beams are required (again for a one-dimensional array 55), requiring now nearly 50 apparatus 30 each 128×128 actuator elements 37. In one example, it is not necessary to have 50 separate apparatus 30 because the more than one array 36 can be placed in the image plane of a single apparatus 30.

It will be obvious to those skilled in the art that various changes may be made without departing from the scope of the invention, which is not to be considered limited to what is described in the specification.

What is claimed is:

1. An apparatus for optically steering a light beam, the apparatus comprising:
    a plurality of actuator elements forming a first two-dimensional array of actuator elements;
    a plurality of actuator elements forming a second two-dimensional array of actuator elements; and
    at least one optical element,
    wherein the first two-dimensional array of actuator elements, the second two-dimensional array of actuator elements and the at least one optical element are configured such that the light beam illuminates a plurality of the actuator elements in the first two-dimensional array of actuator elements and travels a light path between the first two-dimensional array of actuator elements, the at least one optical element and the second two-dimensional array of actuator elements,
    wherein a height of each actuator element in at least one of the first and second two-dimensional arrays of actuator elements is variable within a predetermined range, with the predetermined range defining a stroke size S of the actuator element, such that a direction of the light beam is operable to be changed simultaneously in two orthogonal planes, and
    wherein the first two-dimensional array is imaged onto the second two-dimensional array.

2. The apparatus as claimed in claim 1 further comprising an input light source adapted to generate the light beam and an input mirror adapted to reflect the light beam.

3. The apparatus as claimed in claim 1 wherein the at least one optical element comprises first and second optical elements.

4. The apparatus as claimed in claim 1, wherein a plurality of portions of the light beam reflect off different sets of the actuator elements in the first two-dimensional array of actuator elements, such that each of the portions of the light beam travels an individual light path,
    wherein a height of each of the different sets of the actuator elements is controlled such that a time it takes each portion of the light beam to travel its individual light path is variable, and
    wherein the time for each of the portions of the light beam to travel its individual light path is selected such that the light beam exits a last two-dimensional array of actuator elements in the light path and propagates in a steered direction.

5. The apparatus as claimed in claim 4, wherein at least one of the portions of the light beam is passed through an aperture after traveling its individual light path.

6. The apparatus as claimed in claim 4, wherein an image of the portions of the light beam is formed in a high-index material after the portions of the light beam travel their individual light paths, and
    wherein a size of the image is reduced by a factor of the refractive index of the high-index material to increase the steered angle of propagation of the light beam.

7. The apparatus as claimed in claim 6, wherein the high-index material comprises silicon.

8. The apparatus as claimed in claim 1 wherein the at least one optical element comprises a spherical mirror.

9. The apparatus as claimed in claim 1, wherein the first and second two-dimensional arrays of actuator elements is selected from micro-electromechanical systems, piezo-electric pistons, and electro-ceramic systems.

10. The apparatus as claimed in claim 9 wherein each of the actuator elements in the first and second two-dimensional arrays of actuator elements is reflective.

11. The apparatus as claimed in claim 9, wherein at least one of the first and second two-dimensional arrays actuator elements is formed on a spherical surface.

12. A method for optically steering a light beam, the method comprising:
    inputting the light beam;
    reflecting the light beam onto a plurality of actuator elements in a first two-dimensional array of actuator elements such that the light beam travels a path between the first two-dimensional array of actuator elements at least one optical element and a second two-dimensional array of actuator elements; and
    controlling a height of each of the actuator elements in at least one of the first and second two-dimensional arrays of actuator elements within a predetermined range, with the predetermined range defining a stroke size S of the actuator elements, such that a direction of the light beam is operable to be changed simultaneously in two orthogonal planes,
    wherein the first two-dimensional array is imaged onto the second two-dimensional array.

13. The method as claimed in claim 12, wherein the step of reflecting the light beam onto the plurality of actuator elements in the first two-dimensional array of actuator elements comprises reflecting a plurality of portions of the light beam off different sets of the actuator elements, such that each of the portions of the light beam travels an individual light path, wherein a height of each of the different sets of the actuator elements is controlled such that a time it takes each portion of the light beam to travel its individual light path is variable, and wherein the time for each of the portions of the light beam to travel its individual light path is selected such that the light beam exits last two-dimensional array of actuator elements in the light path and propagates in a steered direction.

14. The method as claimed in claim 13, further comprising reducing a size of an image of the portions of the light beam that is formed after each of the portions of the light beam travels its individual light path to increase the steered angle of propagation of the light beam.

15. The method as claimed in claim 14, wherein the step of reducing the size of the image comprises forming the image of the portions of the light beam in a high-index material.

16. A system for optically steering light beams, the system comprising:

a plurality of optical time delay apparatuses selected to form a steered optical beam of a desired width, wherein each optical time delay apparatus comprises:

a light source adapted to generate a light beam;

a mirror adapted to reflect the light beam;

a plurality of actuator elements forming a first two-dimensional array of actuator elements;

a plurality of actuator elements forming a second two-dimensional array of actuator elements; and at least one optical element, wherein the first two-dimensional array of actuator elements, the second two-dimensional array of actuator elements and the at least one optical element are configured such that the light beam reflected by the mirror illuminates a plurality of the actuator elements in the first two-dimensional array of actuator elements and travels a light path between the first two-dimensional array of actuator elements, the at least one optical element and the second two-dimensional array of actuator elements, wherein a height of each actuator element in at least one of the first and second two-dimensional arrays of actuator elements is variable within a predetermined range, with the predetermined range defining a stroke size S of the actuator element, such that a direction of the light beam is operable to be changed simultaneously in two orthogonal planes, and wherein the first two-dimensional array is imaged onto the second two-dimensional array.

17. The apparatus as claimed in claim 1, wherein the light beam is imaged onto and reflects off n two-dimensional arrays of the actuator elements while traveling the light path, with n being a whole number greater than or equal to two, wherein a time it takes for portions of the light beam to travel the light path is variable, and wherein a maximum time delay that can be obtained for the portions of the light beam is defined by the equation: $T_{max}=(2*n*S)/c$, where c is the speed of light.

18. The method as claimed in claim 12, further comprising reflecting the light beam off n two-dimensional arrays of the actuator elements while the light beam travels the path, with n being a whole number greater than or equal to two, wherein a time it takes for portions of the light beam to travel the path is variable, and wherein a maximum time delay that can be obtained for the portions of the light beam is defined by the equation: $T_{max}=(2*n*S)/c$, where c is the speed of light.

19. The system as claimed in claim 16, further comprising at least one controller programmed to control the height of each actuator element in each optical time delay apparatus such that a portion of the light beam from each optical time delay apparatus exits each of the optical time delay apparatuses and all of the portions of the light beam combine to propagate as a composite light beam having the desired width and traveling in a steered direction.

20. The system as claimed in claim 16, wherein the light beam reflects off n two-dimensional arrays of the actuator elements while traveling the light path, with n being a whole number greater than or equal to two, wherein a time it takes for portions of the light beam reflected off each of the actuator elements to travel the light path is variable, and wherein a maximum time delay that can be obtained for each of the portions of the light beam reflected off each of the actuator elements is defined by the equation: $T_{max}=(2*n*S)/c$, where c is the speed of light.

* * * * *

UNITED STATES PATENT AND TRADEMARK OFFICE
CERTIFICATE OF CORRECTION

PATENT NO. : 7,430,347 B2
APPLICATION NO. : 11/184535
DATED : September 30, 2008
INVENTOR(S) : Betty Lise Anderson and Stuart A. Collins, Jr.

It is certified that error appears in the above-identified patent and that said Letters Patent is hereby corrected as shown below:

Claim 11, Column 8, line 48, after "arrays" please insert -- of --.

Claim 13, Column 9, line 13, after "exits" please insert -- a --.

Claim 20, Column 10, line 35, after "off" please delete "11" and insert -- n --.

Signed and Sealed this

Ninth Day of December, 2008

JON W. DUDAS
*Director of the United States Patent and Trademark Office*